UNITED STATES PATENT OFFICE.

WILHELM NAGAJOSHI NAGAI, OF TOKYO, JAPAN, ASSIGNOR TO M. DICK BUNNELL, OF SAN FRANCISCO, CALIFORNIA.

MYDRIATIC AND PROCESS OF MAKING SAME.

1,356,877.     Specification of Letters Patent.     Patented Oct. 26, 1920.

No Drawing.     Application filed April 1, 1916. Serial No. 88,224.

*To all whom it may concern:*

Be it known that I, WILHELM NAGAJOSHI NAGAI, a subject of the Emperor of Japan, residing at Tokyo, Japan, have invented a certain new and useful Mydriatic and Process of Making Same, of which the following is a specification.

My invention relates to a new and useful synthetic pupil-dilatating drug product of the alkaloid type, resembling in its pupil-dilatating effect the alkaloid ephedrin, which the Chinese natural drug ephedra vulgaris contains. The invention also relates to the process of preparing said product. The novel product, methylmydriatin, which is derived from mydriatin ($C_9.H_{13}.N.O.$), is an alkaloid synthetically produced and so named by me; and in practice it is most desirably produced as the sulfate or hydrochlorid, in which forms it yields white crystals which dissolve in water, giving neutral or faintly acid solutions. A few drops of this synthetic alkaloid preparation placed in the eye will produce the same pupil-dilatating effect as the alkaloid ephedrin in the Chinese drug ephedra vulgaris, the effect lasting about 10 hours, more or less; while with atropin drops, it takes several days to restore the eyes to normal condition. Hence this new drug is preferable to the aforesaid atropin drops for examinations of the eyes.

The hydrochlorid of methylmydriatin forms colorless short prismatic crystals melting at 182° C., and soluble in water and alcohol in any proportion, the solution being neutral in reaction. When, to the aqueous solution, are gradually added two or three drops of diluted copper sulfate solution and an excess of sodium hydrate, and the mixture shaken, a violet coloration is produced, but no precipitate. When ether is added to the above mixture and shaken therewith, the violet coloration passes into the ether. Silver nitrate added to the aqueous solution produces a white flocky precipitate.

In order that my invention may be better understood, I will now proceed to describe an efficient method of preparing the said synthetic drug product. In a vessel, a mixture of benzaldehyde and nitroethane is agitated for several hours at ordinary temperature, in the presence of a solution of a weak alkaline substance, such as suitable alkali carbonates, bicarbonates, phosphates, or pyridin, etc. To separate the condensation-product of benzaldehyde and nitroethane (phenylnitropropanol, $C_6H_5 — CH.OH. — CH.NO_2 — CH_3$) from the residual unchanged benzaldehyde and nitroethane, the reaction mixture is treated with ether, and the etheric lever containing the organic substances in solution is separated from the aqueous layer, washed with water and then mixed with a concentrated aqueous sodium bisulfite solution and vigorously agitated. Through this step the benzaldehyde which has escaped the reaction is taken up by the sodium bisulfite solution. Then the etheric solution is separated from the bisulfite solution by means of a separating funnel. The etheric solution is then washed with water and the ether distilled away. This distillation is carried on under diminished pressure in order to remove the remainder of the nitroethane, thus leaving the condensation product, phenylnitropropanol, in the form of an oily residue. This residue is then dissolved in dilute alcohol and reduced in the presence of formaldehyde solution by adding the necessary quantity of diluted acetic acid and zinc-dust thereto at the lowest possible temperature. Then the acid liquid is filtered from the remaining zinc and is saturated with hydrogen sulfid gas. The liquid is now filtered from the zinc sulfid precipitate and the alcohol, acetic acid and water are finally distilled away under diminished pressure. The thick liquid remaining generally still contains a small quantity of a resinous substance. To this thick liquid are added diluted hydrochloric acid and ether and the whole shaken vigorously, by which process the resinous substance and the remaining acetic acid are transferred into the ether. The aqueous layer is separated from the etheric layer by means of a separating funnel and is evaporated under diminished pressure and at low temperature. The residue thus obtained is the hydrochlorid of the new artificial alkaloid, methyl-mydriatin (phenylmethylaminopropanol) or artificial ephedrin, in the form of a crystalline mass, from which characteristic transparent, colorless, small prismatic crystals can be obtained by recrystallization from solution in a small quantity of absolute alcohol. The probable structural formulæ of mydriatin and methylmydriatin are as follows:

Mydriatin—(C₉.H₁₃.N.O.)=C₆H₅—CH—CH—CH₃
                              |     |
                              OH   NH₂

Methylmydriatin—(C₉.H₁₂.CH₃.N.O.)=C₆H₅—CH—CH—CH₃
                                        |     |
                                        OH   NHCH₃ from which it is apparent that the new product is a phenylalkylaminopropanol.

Mydriatin itself is a mixture of two α and β racemic forms of phenylaminopropanol, which are produced simultaneously when the condensation product, phenylnitropropanol, is reduced, owing to the presence of two asymmetric carbon atoms in the molecule. Similarly methylmydriatin, that is, the n-monomethyl derivatives of these α and β forms, is racemic.

What I claim is:

1. As a new article of manufacture, synthetically prepared alkaloid phenylmethylaminopropanol resembling in its pupil-dilatating effects the alkaloid ephedrin which the Chinese natural drug ephedra vulgaris contains, its hydrochlorid consisting of colorless short prismatic crystals melting at 182° C., soluble in water and alcohol in any proportion and of neutral reaction, and characterized by the facts that when to its aqueous solution is gradually added two or three drops of diluted copper sulfate solution and an excess of sodium hydrate, and the mixture shaken, a violet coloration is produced, but no precipitate; that when ether is added to the above mixture and shaken therewith, the violet coloration passes into the ether; and further characterized by the fact that silver nitrate produces in its aqueous solution a white flocky precipitate; substantially as described and for the purposes set forth.

2. As a new article of manufacture, a substance comprising synthetic racemic phenylmonomethylaminopropanol having probably the structural formula

C₆H₅—CH—CH—CH₃
      |     |
      OH   NHCH₃ and capable of producing desirable physiological effects.

3. The method of producing a synthetic alkaloid, phenylmethylaminopropanol, which comprises reducing the condensation product of benzaldehyde and nitroethane (phenylnitropropanol), in the presence of formaldehyde, substantially as described and for the purpose set forth.

4. The method of producing a synthetic alkaloid which comprises condensing benzaldehyde with nitroethane in the presence of an alkaline substance, separating the condensation product, and reducing the same in the presence of formaldehyde, substantially as described.

In witness whereof, I have hereunto set my signature in the presence of two subscribing witnesses.

WILHELM NAGAJOSHI NAGAI.

Witnesses:
 CHARLES J. ARNELL,
 HARRY F. HAWLEY.